US011277341B2

(12) United States Patent
Townsley et al.

(10) Patent No.: US 11,277,341 B2
(45) Date of Patent: *Mar. 15, 2022

(54) RESILIENT SEGMENT ROUTING SERVICE HUNTING WITH TCP SESSION STICKINESS

(71) Applicant: CISCO TECHNOLOGY, INC., San Jose, CA (US)

(72) Inventors: William Mark Townsley, Paris (FR); Andre Surcouf, Saint Leu la Foret (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/673,508

(22) Filed: Nov. 4, 2019

(65) Prior Publication Data
US 2020/0067835 A1 Feb. 27, 2020

Related U.S. Application Data

(62) Division of application No. 15/132,920, filed on Apr. 19, 2016, now Pat. No. 10,505,846.

(60) Provisional application No. 62/195,656, filed on Jul. 22, 2015.

(51) Int. Cl.
| *H04L 12/715* | (2013.01) |
| *H04L 12/721* | (2013.01) |
| *H04L 12/723* | (2013.01) |
| *H04L 12/741* | (2013.01) |
| *H04L 29/06* | (2006.01) |
| *H04L 45/745* | (2022.01) |
| *H04L 45/64* | (2022.01) |
| *H04L 45/00* | (2022.01) |
| *H04L 45/50* | (2022.01) |
| *H04L 69/22* | (2022.01) |
| *H04L 65/612* | (2022.01) |

(52) U.S. Cl.
CPC ............ *H04L 45/745* (2013.01); *H04L 45/34* (2013.01); *H04L 45/50* (2013.01); *H04L 45/64* (2013.01); *H04L 65/4084* (2013.01); *H04L 69/22* (2013.01)

(58) Field of Classification Search
None
See application file for complete search history.

(56) References Cited

U.S. PATENT DOCUMENTS

| 6,340,184 B1 | 1/2002 | Kuzmich |
| 6,587,438 B1 | 7/2003 | Brendel |
| 7,382,787 B1 | 6/2008 | Barnes |

(Continued)

*Primary Examiner* — Alpus Hsu

(57) ABSTRACT

According to one aspect, a method includes obtaining a segment routing (SR) packet from an endpoint via a first router at a first server along a path, the SR packet including an SR list and a last address, the last address being an address of a requested service. The method also includes determining, at the first server, whether the requested service is available from the first server, wherein determining whether the requested service is available from the first server includes opening the SR packet, parsing an SR header of the SR packet, and performing a lookup in a service table. Finally, the method includes modifying the SR packet at the first server when it is determined that the requested service is not available from the first server; and forwarding the SR packet along the path.

20 Claims, 7 Drawing Sheets

(56) References Cited

U.S. PATENT DOCUMENTS

| | | |
|---|---|---|
| 7,418,536 B2 | 8/2008 | Leung |
| 7,440,405 B2 | 10/2008 | Hsieh |
| 7,466,703 B1 | 12/2008 | Arunachalam |
| 7,467,227 B1 | 12/2008 | Nguyen |
| 7,668,161 B2 | 2/2010 | Morgan |
| 7,688,829 B2 | 3/2010 | Guichard |
| 8,059,650 B2 | 11/2011 | Shetty |
| 8,078,761 B2 | 12/2011 | Cardina |
| 8,081,566 B1 | 12/2011 | Ashwood-Smith |
| 8,160,055 B1 | 4/2012 | Nadeau |
| 8,270,401 B1 | 9/2012 | Barnes |
| 8,284,776 B2 | 10/2012 | Petersen |
| 8,451,838 B2 | 5/2013 | Ra |
| 8,615,009 B1 | 12/2013 | Ramamoorthi |
| 9,036,476 B2 | 5/2015 | Grandhi |
| 9,300,584 B1 | 3/2016 | Filsfils |
| 9,363,180 B2 | 6/2016 | Beliveau |
| 9,444,677 B2 | 9/2016 | Kumar |
| 9,450,829 B2 | 9/2016 | Filsfils |
| 9,455,908 B2 | 9/2016 | Fernando |
| 9,491,058 B2 | 11/2016 | Filsfils |
| 9,516,118 B2 * | 12/2016 | Kini ............... H04L 45/507 |
| 9,537,718 B2 * | 1/2017 | Bashandy ......... H04L 12/4633 |
| 9,537,769 B2 | 1/2017 | Bryant |
| 9,660,897 B1 | 5/2017 | Gredler |
| 9,680,745 B2 | 6/2017 | Roch |
| 9,729,439 B2 | 8/2017 | MeLampy |
| 9,736,063 B2 | 8/2017 | Wan |
| 9,762,488 B2 | 9/2017 | Previdi |
| 9,853,898 B1 | 12/2017 | Subramanian |
| 9,926,946 B2 | 3/2018 | Cullman |
| 9,979,601 B2 * | 5/2018 | Filsfils ............ H04L 45/12 |
| 10,038,628 B2 * | 7/2018 | Ravinoothala ......... H04L 45/42 |
| 10,277,508 B2 * | 4/2019 | Niu .................. H04L 45/00 |
| 10,313,415 B2 * | 6/2019 | Surcouf ........... H04N 21/6581 |
| 10,462,055 B2 * | 10/2019 | Surcouf .............. H04L 45/742 |
| 2008/0159288 A1 | 7/2008 | Nagarajan |
| 2013/0272305 A1 | 10/2013 | Lefebvre |
| 2014/0195666 A1 | 7/2014 | Dumitriu |
| 2014/0241345 A1 | 8/2014 | DeCusatis |
| 2015/0124827 A1 | 5/2015 | Rangaraman |
| 2016/0021162 A1 | 1/2016 | Surcouf |
| 2016/0099864 A1 * | 4/2016 | Akiya ................ H04L 45/28 370/216 |
| 2016/0112313 A1 * | 4/2016 | Niu ................... H04L 45/74 370/392 |
| 2017/0149685 A1 * | 5/2017 | Wu ................... H04L 45/34 |
| 2017/0373966 A1 * | 12/2017 | Liao ................. H04L 45/507 |

* cited by examiner

RESILIENT SEGMENT ROUTING SERVICE HUNTING WITH TCP SESSION STICKINESS

CROSS-REFERENCE TO RELATED APPLICATION

The present application is a divisional of U.S. patent application Ser. No. 15/132,920 entitled "RESILIENT SEGMENT ROUTING SERVICE HUNTING WITH TCP SESSION STICKINESS", filed on Apr. 19, 2016, which claims the benefit of U.S. Provisional Patent Application No. 62/195,656, filed Jul. 22, 2015 and entitled "Resilient Segment Routing Service Hunting with TCP Session Stickiness" (U.S. Pat. No. 10,505,846, issued Dec. 10, 2019). The contents of these applications are incorporated herein by reference in their entirety.

TECHNICAL FIELD

The disclosure relates generally to delivering content within networks. More particularly, the disclosure relates to using Segment Routing (SR) service hunting to allow a client to access a service hosted on a list of servers referenced in an SR list.

BACKGROUND

Segment Routing (SR) allows an IPv6 or Multiprotocol Label Switching (MPLS) packet header to encode a list of explicit waypoints, e.g., SR nodes, rather than a single destination. Such waypoints or SR nodes may be used to route packets through a specific service or application. Accessing a particular service hosted on any one of a list of servers, however, is time-consuming and inefficient.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
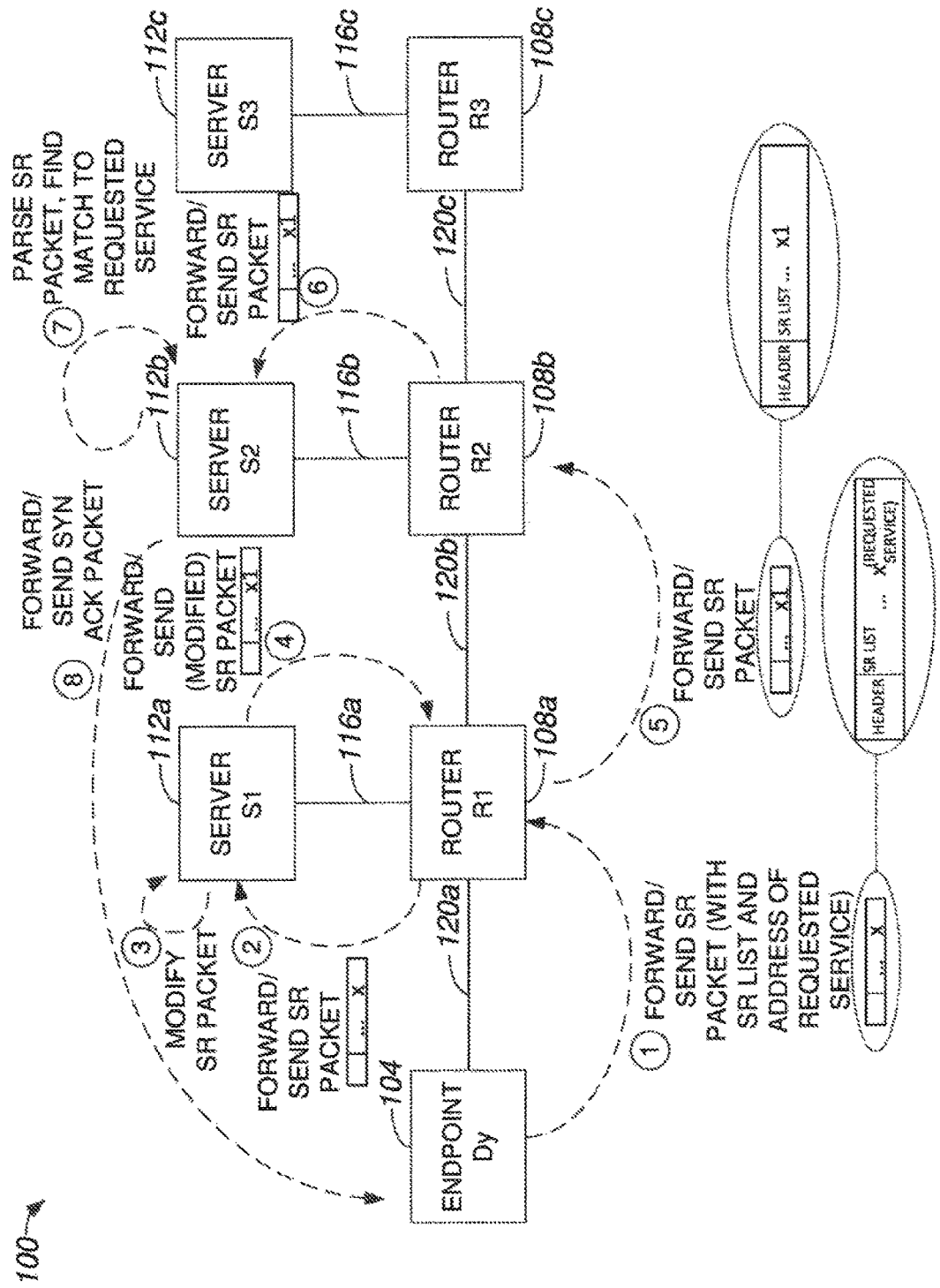
FIG. 1 is a diagrammatic representation of a network which supports a service hunting process in accordance with an embodiment.
Figure 2A:
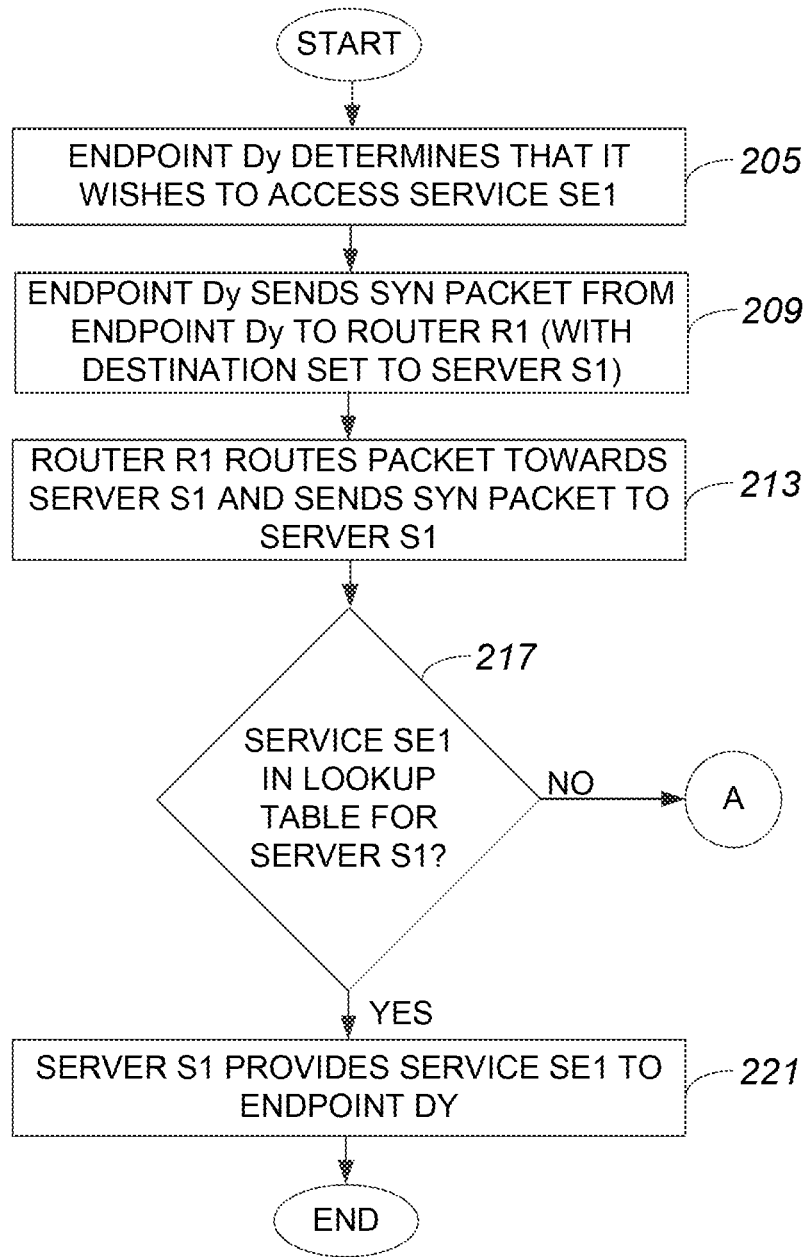
FIGS. 2A-D are a process flow diagram which illustrates a process of resilient segment routing (SR) service hunting in accordance with an embodiment.
Figure 2B:
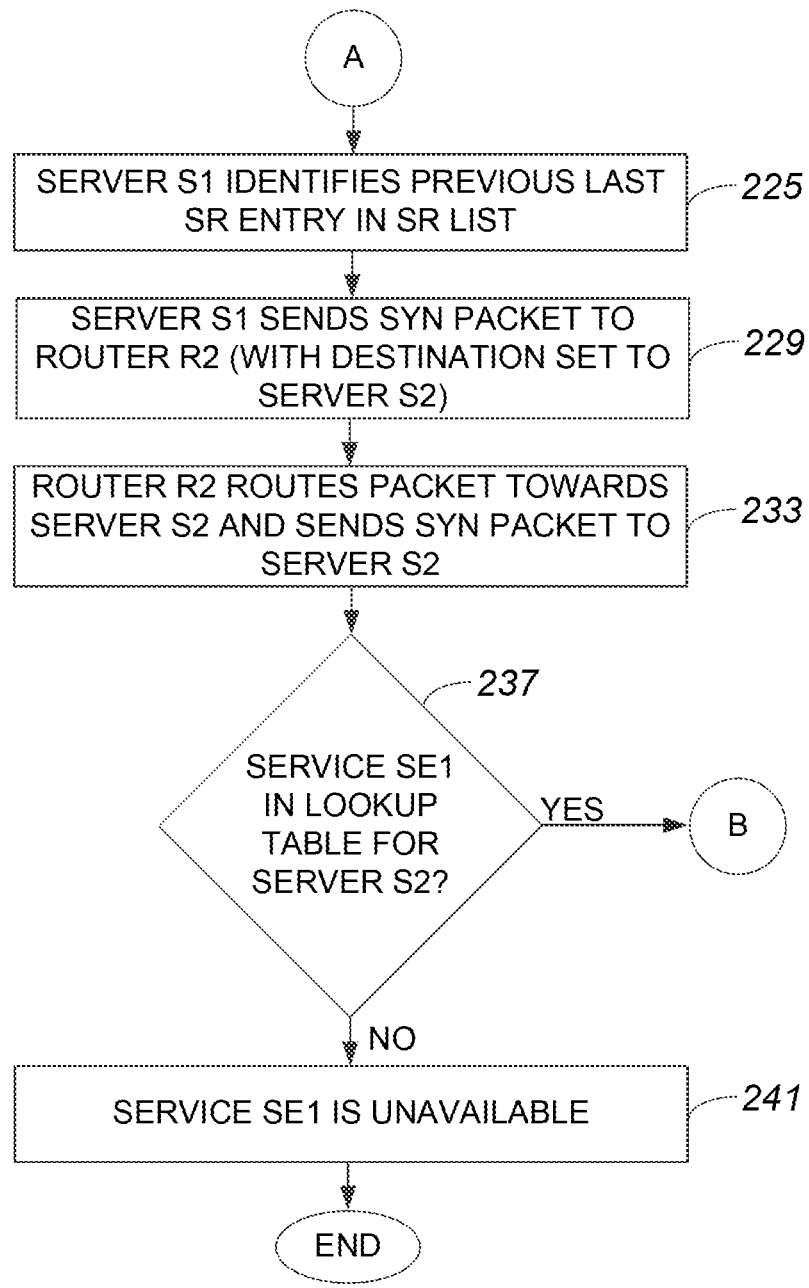
Figure 2C:
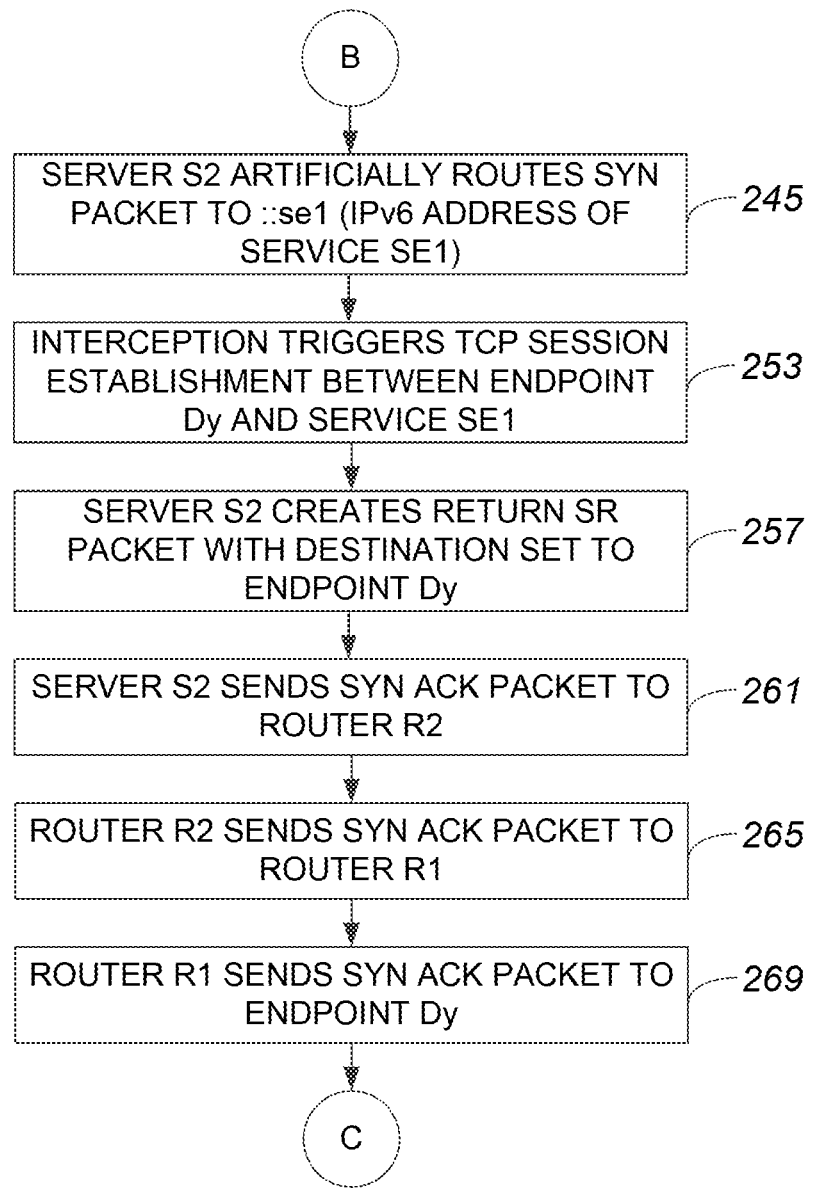
Figure 2D:
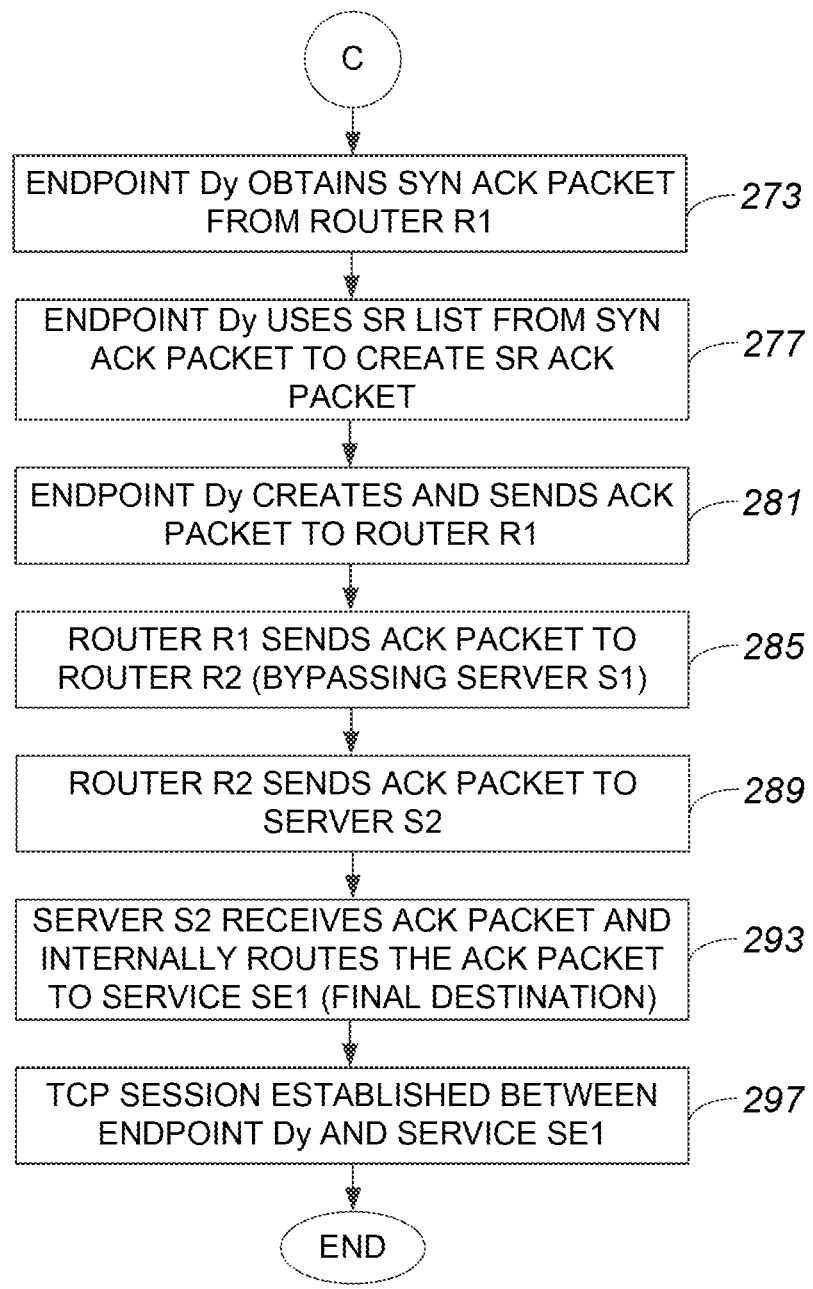

In one embodiment, a method includes obtaining a segment routing (SR) packet from an endpoint via a first router at a first server along a path, the SR packet including an SR list and a first address, the first address being an address of a requested service. The first address may be the first address in a header and the last in the SR list, e.g., the first address from the SR list may be the first destination that the SR packet will go to. The method also includes determining, at the first server, whether the requested service is available from the first server, wherein determining whether the requested service is available from the first server includes opening the SR packet, parsing an SR header of the SR packet, and performing a lookup in a service table. Finally, the method includes modifying the SR packet at the first server when it is determined that the requested service is not available from the first server; and forwarding the SR packet along the path.

Description

Common content streaming systems typically utilize web protocols, as for example a hypertext transport protocol (HTTP), that operates at substantially all application layers. As common content streaming systems rely on Domain Name Service (DNS) and HTTP, Transmission Control Protocol (TCP), and/or Internet Protocol (IP), technical tradeoffs and limitations may result in compromising the quality of streaming content. Common content streaming systems include, but are not limited to including, video streaming systems and audio streaming systems.

Segment Routing (SR) protocol architectures generally allow a shift from substantially centralized delivery of streaming video and single-point fetching to a data-centric object fetch approach at an inter-networking layer. As a result, more efficient streaming systems may be designed. When SR is used to enable video stored on servers to be provided to a client, a single connection may be opened and a network may handle the process of accessing video.

SR allows an IPv6 or Multiprotocol Label Switching (MPLS) packet header to encode a list of explicit waypoints, e.g., SR nodes, rather than a single destination. Such waypoints or SR nodes may be used to route packets through a specific service or application. For example, SR may route packets to or through a specific aspect of an application and/or a service as long as that specific aspect may be uniquely numbered and represented by an explicit waypoint such as an SR node. An aspect may be, but is not limited to being, a uniquely identifiable chunk of data in a content caching or video delivery application.

Some systems allow IPv6 SR to be used to search for or otherwise hunt for a particular piece of content or service which may reside on substantially any SR-capable waypoint or node running an application that will provide the piece of content or service. Such systems typically rely upon the ability of an SR-capable node to intercept a packet at an intermediate waypoint during a session on the way to a final destination in an SR list. In addition, subsequent packets may reach the same intermediate waypoint without being intercepted by any other waypoints for the life of the session.

In one embodiment, a new mechanism that enables a client to access a service hosted on a list of servers referenced in an SR list is provided. In another embodiment, servers are substantially auto-selected without a client noticing which server has accepted a connection request. SR may be used to allow a server selection process to be more automatic and transparent to a client or an endpoint requesting a service.

Specific IPv6 addresses are searched for, or hunted for, along a path of specified IPv6 addresses in an SR list. When a match is found to a specific IP address, the match may correspond to either an application that will result in an instantiation of a new TCP session on a particular node from the SR list, or may be associated with an already existing TCP session. An initial TCP packet may have a different SR list than a subsequent reply and packets thereafter. The ability to direct traffic to a node with a TCP session may be provided in a way that does not require substantially modifications to existing TCP stacks. An IPv6 stack may provide proper primitives to essentially support load balancing of a stateful session such as a TCP session across a set of nodes as defined by an IPv6 SR list.

When a service is located after a hunting process, communication is effectively established between a node which hosts the service and an original client, e.g., the client which requested the service. As such, subsequent packets do not have to go through the hunting process.

Referring initially to FIG. 1, a process of substantially transparently diverting service access delivery SR traffic to a server hosting the service that is subject to a service request will be described in accordance with an embodiment. FIG. 1 is a diagrammatic representation of a network in which at least one server is in communication with, e.g., is attached to, a router in accordance with an embodiment. A network 100 includes an endpoint Dy 104, routers 108a-c, and servers 112a-c. A link 120a allows endpoint Dy 104 to communicate with router R1 108a, a link 120b allows router R1 108a to communicate with router R2 108b, and a link 120c allows router R2 108b to communicate with router RC 108c. Router R1 108a communicates with server S1 112a over a link 116a, router R2 108b communicates with server S2 112b over a link 116b, and router R3 108c communicates with server S3 112c over a link 116c.

It should be appreciated that endpoint Dy 104 is a SR-capable node, routers 108a-c are SR-capable routers, and servers 112a-c are SR-capable servers. Services are generally hosted on servers 112a-c, while endpoint Dy 104 may be considered to be a client which attempts to access a service hosted on one of servers 112a-c. In the described embodiment, server S1 112a is a router companion server to router R1 108a, server S2 112b is a router companion server to router R2 108b, and server S3 112c is a router companion server to router R3 108c.

Endpoint Dy 104 may determine, as for example at a time t0, that endpoint Dy wishes to access a service SE1. Service SE1 may have a V6 @IP of::se1, which represents the IP address of service SE1. That is, an initial destination address of::se1, as set forth in an SR list, is the address of the service that endpoint Dy 104 wants to access. It should be appreciated that endpoint Dy 104 may have a V6 @IP of::dy, while server S1 112a may have a V6 @IP of::s1, and router R1 108a may have a V6 @IP of::r1. In one embodiment, service SE1 may be delivered by server S2 11b, which may have a V6 @IP of::s2, but may not be delivered by server S1 112a.

Upon endpoint Dy 104 determining that it wishes to access service SE1, an application hosted on endpoint Dy 104 generally attempts to open a socket against ::se1. In order to open a socket against ::se1, endpoint Dy 104 may forward or send an SR packet at a time t1 through network 100, as for example on link 120a. The SR packet generally includes an SR list and an address associated with the requested service, e.g., service SE1 with V6 address of::se1. The SR list may be used to find the service or data, and may include a list of substantially all possible nodes which may provide the requested service, and/or the SR list may be used to find a TCP session state and may include an SR list with an entry which identifies where a TCP state is in addition to a V6 address identifier for the requested service. In one embodiment, a first entry in the SR list identifies the requested service, while the remaining entries on the list identify substantially all candidate nodes on which it may be possible to locate the requested service.

Router R1 108a obtains or receives the SR packet on link 120a and, at a time t2, forwards or sends the SR packet to server S1 112a. Router R1 108a has a route toward server S1 112a and, thus, provides the SR packet to server S1 112a.

After server S1 112a obtains or receives the SR packet, server S1 112a parses and modifies the SR packet at a time t3. Because server S1 108a is SR-capable, server S1 112a opens up the SR packet and parses the SR header (SRH). As server S1 112a is a server that hosts services, server S1 112a is aware that the last V6 address in the SR list of the SR packet represents a service, e.g., service SE1. Hence, server S1 112a performs a lookup in its service table based on the last V6 address in the SR list. In the described embodiment, the lookup in the service table of server S1 112a does not identify a match, and the implication is that service SE1 is not available from server S1 112a, or may temporarily be unavailable from server S1 112a for any number of reasons.

At a time t4, server s1 112a forwards or sends the modified SR packet towards server S2 112b via router R1 108a. Router R1 108a forwards or sends the SR packet on link 120b to router R2 108b at a time t5. Upon receiving the SR packet, router R2 108b routes the SR packet to server S2 112b over link 116b at a time t6.

Server S2 112b obtains or receives the SR packet from router R2 108b and, at a time t7, opens the SR packet and parses the SRH. Because server S2 11b is a server hosting services, server S2 112b is aware that the last V6 address in the server list represents a requested service. Server S2 112b performs a lookup in its service table and, in the described embodiment, locates a match. As such, server S2 112b determines that the requested service, e.g., service SE1, may be delivered by or from server S2 112b.

Once server S2 112b determines that it may deliver the requested service, namely SE1, server S2 112b sends a SYN ACK packet back to endpoint Dy 104 at a time t8. At this point, sever S2 112b has effectively been elected as the server which will deliver the service SE1 to endpoint Dy 104. In addition, the indication is that a socket between ::dy and ::se1 is effectively a socket between endpoint Dy 104 and server S2 112b.

With reference to FIGS. 2A-D, a process of resilient SR service hunting will be described in accordance with an embodiment. For purposes of discussion, the method of FIGS. 2A-D will be described with reference to the network of FIG. 1. A process 200 of resilient SR service hunting begins at step 205 in which endpoint Dy determines that it wishes to access service SE1. Such a determination generally involves endpoint Dy attempting to open a socket against ::se1. Upon determining that endpoint Dy wants to access service SE1, endpoint Dy sends a SYN packet to router R1 in step 209. The SYN packet sent, or otherwise provided, to router R1 from endpoint Dy has a destination set to identify server S1. In one embodiment, the SYN packet has a source (src) set to identify endpoint Dy, a destination (dst) set to identify server S1, and an index in the SR list (noted SRidx) set to identify ::s2. In addition, the SYN packet typically also has an SR list set to identify ::se1, ::s3, ::s2, and ::s1.

In step 213, router R1 routes the SYN packet towards server S1 and sends the SYN packet to server S1. After server S1 receives or otherwise obtains the SYN packet, server S1 determines, in step 217, whether service SE1 is in a lookup table for server S1. It should be appreciated that because server S1 is SR capable, server S1 may open the SYN packet and parse the SRH of the SYN packet. In addition, because server S1 is capable of hosting services, server S1 is aware that the last V6 address, or IPv6 address, in the SRH represents a service.

If the determination in step 217 is that service SE1 is in the lookup table for server S1, server S1 may provide service SE1 to endpoint Dy in step 221, and the process of resilient segment routing service hunting is completed. It should be appreciated, however, that in the described embodiment, service SE1 is not present on server S1, as discussed above with reference to FIG. 1.

If the determination in step 217 is that service SE1 is not present in the lookup table for server S1, the indication is either that service SE1 is not available on the server S1 or that service SE1 may be temporarily unavailable on server S1. As such, process flow moves from step 217 to step 225 in which server S1 identifies the previous last SR entry in an SR list of the SYN packet.

After identifying the previous last SR entry in an SR list, server S1 modifies the SYN packet and sends the packet to server S2 in step 233. In the described embodiment, server S1 modifies the SYN packet by setting the destination (dst) to server S2, and the index (SRidx) in the SR list to ::s3 (i.e. the next destination). Upon receiving or otherwise obtaining the SYN packet from server S1, router R2 routes the packet towards server S2 and sends the SYN packet to server S2 in step 233.

A determination is made in step 237 as to whether service SE1 is in a lookup table for server S2. If it is determined that service SE1 is not in the lookup table for server S2, service SE1 is determined to be unavailable in step 241, and the process of resilient segment routing service hunting is completed. It should be appreciated that in the described embodiment, service SE1 is available on server S2, as discussed above with respect to FIG. 1.

Alternatively, if the determination in step 237 is that service SE1 is present in the lookup table for server S2, server S2 artificially routes the SYN packet to ::se1, namely the IPv6 address of service SE1, in step 245. It should be appreciated that because server S2 is SR capable, server S2 may open the SYN packet to parse the SRH.

In step 253, an interception triggers the establishment of a TCP session between endpoint Dy and service SE1 physically hosted by server S2, but in reality between endpoint Dy and the service SE1 (::se1) from a TCP stand point. After the establishment of a TCP session is triggered, process flow moves to step 257 in which server S2 creates a return SR packet with a destination set to endpoint Dy. In the described embodiment, the return SR packet includes a source (src) set to ::se1, a destination (dst) set to ::dy, and SR index (SRidx) set to ::dy. Also included in the returned SYN ACK SR packet is a SR set to ::dy and ::s2. One reason for adding ::s2 in the SR list is to enable substantially all subsequent packets to be sent to SE1 (::s1) through S2 (::s2) without following the full SR hunting path.

In step 261, server S2 sends a SYN ACK packet to router R2. It should be appreciated that router R1 and router R2 are aware of the route toward endpoint Dy. Then, in step 265, router R2 sends the SYN ACK packet to router R1. Upon receiving or otherwise obtaining the SYN ACK packet from router R2, router R1 sends or otherwise provides the SYN ACK packet to endpoint Dy in step 269.

In step 273, endpoint Dy obtains the SYN ACK packet from router R1. Once endpoint Dy obtains the SYN ACK packet from router R1, endpoint creates and sends an SR ACK packet to router R1 in step 281. To create the SR ACK packet, endpoint Dy effectively reuses the SR list, but in the reverse order, from the SYN ACK packet obtained from router R1. In one embodiment, the SYN ACK packet specifies a source (src) as ::dy, a destination (dst) as ::s2, and SRidx as ::se1. The SR in the SYN ACK packet may be set to ::se1 and ::s2.

Upon obtaining the ACK packet from endpoint Dy, router R1 sends the AC packet to router R2 in step 285, while bypassing server S1. Router R2, after receiving the ACK packet from router R1, sends the ACK packet to server S2 in step 289. Server S2 receives the ACK packet in step 293, and internally routes the ACK packet to service SE1, the final destination of the ACK packet. Once the ACK packet is routed to service SE1, a TCP session is essentially established between endpoint Dy and service SE1 in step 297, and the process of establishing a resilient TCP session through segment routing service hunting is completed. It should be appreciated that a socket between ::dy and ::se1 is actually a socket between endpoint Dy and service SE1 hosted by server S2, and that server S2 is effectively elected as the server which will deliver service SE1 to endpoint Dy.

An SR list associated with a return path may be created using any suitable option. Suitable options include, but are not limited to, a shortest path regular SR IPv6 containing substantially only the address of the server hosting the service with an SR list added by server S2 112b of FIG. 1 that includes the address of server S2 112b of FIG. 1 to effectively make a return path fully independent from a hunting path, a traffic engineering (TE) delivery based on adaptive network-based congestion algorithms, and/or following a reverse caching path to keep service nodes aware of substantially everything that occurs with respect to content delivery.

An SR list created using a shortest path regular SR IPv6 is such that the actual path effectively does not matter. The creation of an SR list in this manner may be backwards compatible, and the shortest path may be a hunting path. An SR list created by adding an SR list by a server effectively follows a reverse caching path such that service nodes are essentially aware of substantially everything that transpires with respect to content delivery.

As mentioned above, an SR list may also be added by a server such that the SR list contains at least one address of the server. The SR list added by the server may be substantially any SR list determined to be preferable. As a result, the return path may be fully independent from a hunting path. For example, a network administrator may effectively select a return SR path based on what may be best in terms of factors such as load balancing.

Creating an SR list using TE delivery based on adaptive network-based congestion algorithms may include, but is not limited to including, utilizing a Congestion Aware Balancing (CONGA), or CONGA-like, algorithm. As will be appreciated by those skilled in the art, CONGA is a network-based distributed congestion-aware load balancing mechanism.

Servers may be unreachable for any number of different reasons. For example, a server may be crashed, or a link between a server and a router may be down or otherwise unavailable. Alternatively, an application running on a server may be crashed, but a server kernel may still be up and running.

Figure 3:
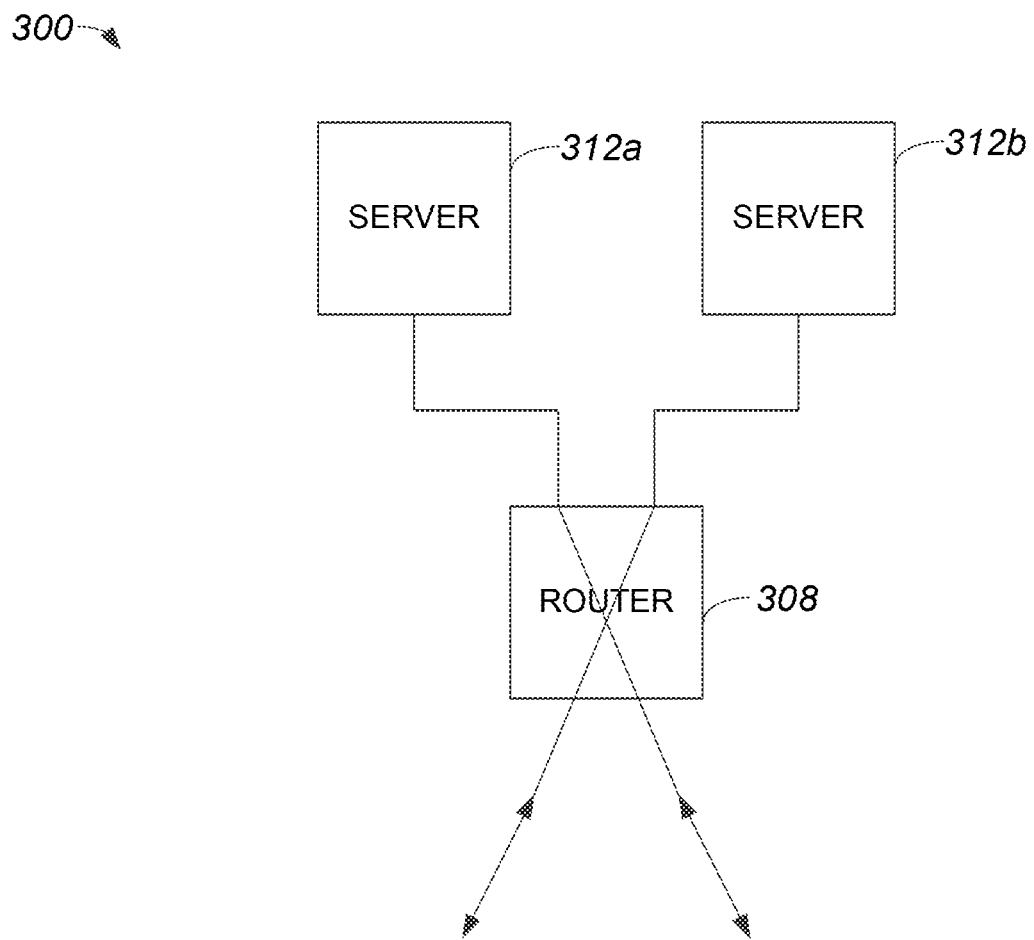
FIG. 3 is a block diagram representation of a network in accordance with an embodiment.

When a server, as for example a first hop in an SR list, is down, then an initial SR packet sent by an endpoint device will effectively never reach the server. As a router may not be able to correct the problem with the unavailable server, the endpoint device which sends the initial SR packet typically receives a "destination unreachable" message, and/or the SR packet will not be routed any further through a network. In one embodiment, a virtual router redundancy protocol (VRRP) may be used between the unavailable server and the router, which is an SR-capable router, such that the router may use the IPv6 address of the server to process the packet and to forward the packet to the next hop in the SR list. With reference FIG. 3, which is a block diagram representation of a network 300, when a server 312a is unavailable, server failover management may be such that a router 308 processes a received packet intended for server 312a and forwards the received packet to a server 312b.

Figure 4:
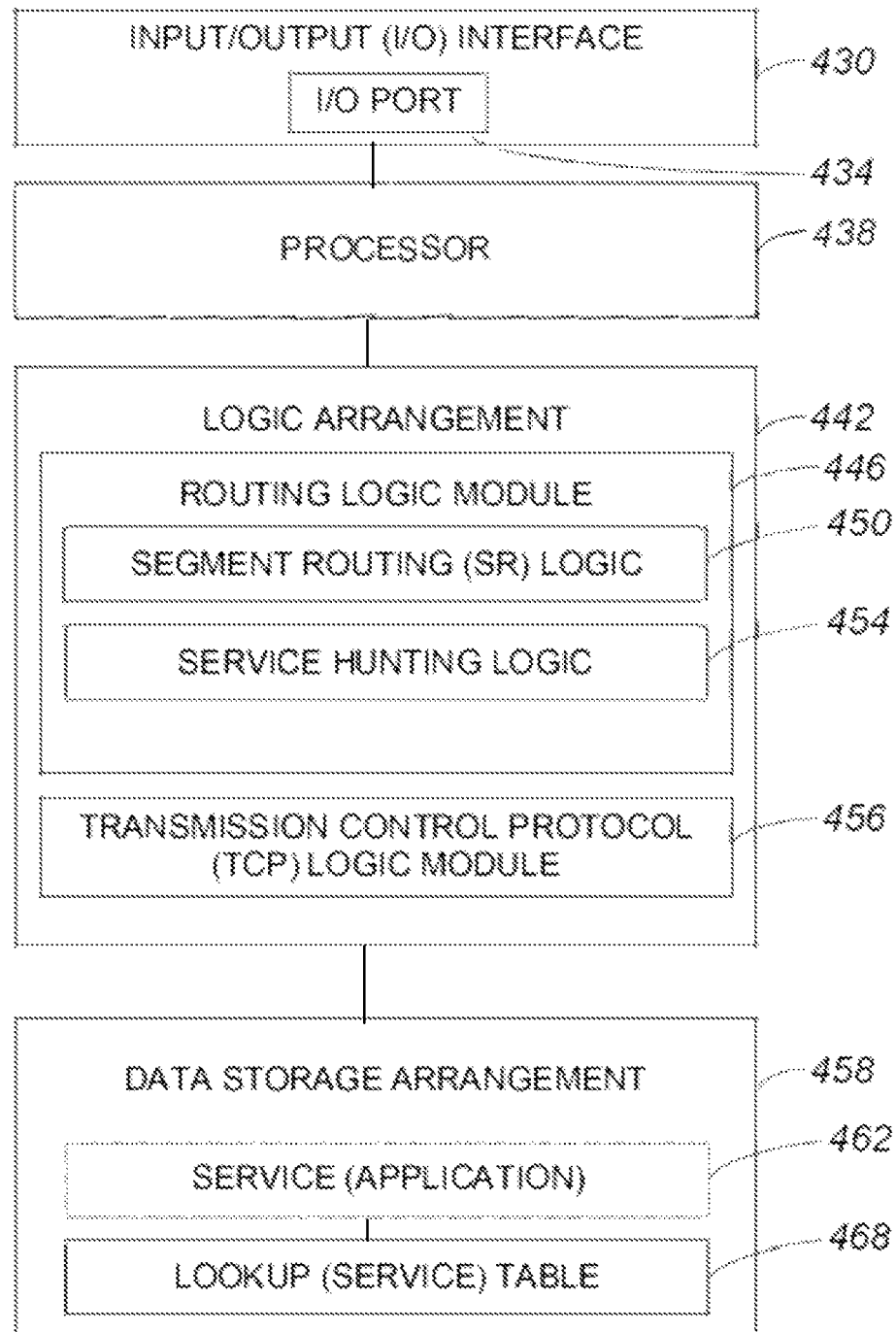
FIG. 4 is a diagrammatic representation of a SR capable node or waypoint in accordance with an embodiment.

When a server kernel is up and running, but an application executing on the server is crashed, an SR packet will effectively be routed to the server which hosts the crashed application. Once the SR packet is obtained by the server which hosts the crashed application, the SR packet is generally not processed and, therefore, no lookup is typically performed. As such, the packet will not be routed any further. In one embodiment, a time-out may result in a device application executing on an endpoint device which sent the packet. Upon a time-out, the endpoint device may attempt to establish a TCP session with service through each of the nodes, e.g., servers, identified in an initial SR list. In such an embodiment, the first server to answer to the attempt to establish a TCP session FIG. 4 is a diagrammatic representation of an SR capable node or waypoint, e.g., an SR capable server or router, in accordance with an embodiment. An SR capable node 402 includes an input/output (I/O) interface 430, a processor 438, a logic arrangement 442, and a data storage arrangement 458. SR capable node 402 may generally be any suitable endpoint, server, or router within a network that is capable of implementing SR.

I/O interface 430 is configured to enable SR capable node 402 to communicate within a network, and may generally include at least one I/O port 434. I/O interface 430 may support wireless and/or wireless communications. Processor 438 may be a microprocessor, and is arranged to execute program code devices or computer program code. Logic arrangement 442 generally includes hardware and/or software logic arranged to be executed by processor 438. In one embodiment, the software logic, which may include computer program code devices, included in logic arrangement 442 is embodied on a computer-readable medium.

Logic arrangement 442 includes a routing logic module 446 and a TCP logic module 456. Routing logic module 446 includes SR logic 450 and service hunting logic 454. SR logic 450 allows SR capable node 402 to support SR, and service hunting logic 454 is arranged to create and send an SR list which identifies a requested service, and to intercept a packet with an SR list such that it may be determined whether SR capable node 402 is capable of providing the requested service. TCP logic module 456 supports TCP, and generally allows SR capable node 402 to support a TCP session.

Data storage arrangement 458 is generally memory, and may store at least one service or application 462 and a lookup table 468. Service 462 may be a service that is subject to a request contained in a SR list, and lookup table 468 may be used to identify which services are stored in data storage arrangement 458 or, more generally, which services are available on SR capable node 402.

An interception mechanism in accordance with this disclosure may be used in any number of situations. An interception mechanism effectively provides an exception path for an SR node such as an SR server to intercept a packet and to take some other action, e.g., to "do something else." The other action taken may be, but is not limited to being, executing substantially any type of application that relies on IP sockets, as for example HTTP, FTP, etc. It should be appreciated that once an SR packet is intercepted, substantially anything may be done with the packet.

A resilient SR service hunting with TCP session stickiness may be implemented, in one embodiment, in Linux. It should be appreciated that a Linux implementation is just one example of a suitable implementation, and other implementations may generally be utilized.

In general, when implemented in Linux, an SR implementation utilizes iptables and netfilter hooks. A kernel module may allow a few requirements to be placed on a host system as possible, thereby allowing a barrier to entry to be lowered and maintenance overhead to be reduced. Thus, an installation of a kernel module may be designed to allow a "make" of a module source while running under a target kernel, followed by "insmod" as will be understood by those skilled in the art. Subsequent configuration and/or reporting may be done by interacting with a pseudofile node.

A pseudofile used to configure and report effectively avoids the need for specialized userland tools. The use of a bump-in-the-stack using netfilter hooks allows for relatively easy plumbing, and L3-only logic provides modularity and/or simplicity. Upon loading of a module, init module may install two netfilter hooks, namely an NF_INET_LOCAL_IN an NF_INET_LOCAL_OUT, for a PF_INET6 protocol.

An NF_INET_LOCAL_IN inbound netfilter hook deals with inspecting or otherwise looking at incoming SR packets and determining whether an SR packet can be intercepted based on a final SR destination, or whether standard SR is to be performed. If a determination is that standard SR is to be performed, an appropriate SR header may be adjusted and sent out. It should be appreciated that the function of adjusting an ST header includes performing a routing lookup. Hence, forwarding generally does not need to be enabled globally for a kernel module to function. It should be appreciated that non-SR incoming packets are not processed. Rather, NF_ACCEPT is returned. As such, the standard processing of non-SR packets by a kernel is completed.

If a hook_func decides that the packet is intended for a particular intercepting module, or for a current intercepting module, then the module may strip the SR header from the packet, and forward the packet for local delivery. In one embodiment, when a module is performing local delivery, during a classification or route lookup, an IPv6 destination of loopback (::1) may be hardcoded into relevant lookup structures. As a result, a "transparent socket" may results. In other words, the destination addresses of content which a hook decides that a module may handle are used for the sockets bound to the unspecified (::) IPv6 addresses. This effect allows a highly dynamic handling of addresses in applications, substantially without needing these addresses to be configured on the interfaces. In addition, this allows modifications to midlayer applications such as HTTP servers to be substantially avoided, and allows existing mechanisms of querying the local server addresses to be used in order to program behaviors.

The lookup of whether a service is intended for a current intercepting module may or not may be performed via an application programming interface (API) of query and/or config functions currently implemented as a simple dynamically allocated array for simplicity purposes, and may be relatively easily adjusted.

An NF_INET_LOCAL_OUT outbound netfilter hook implements client-side functionality of the hosted service, primarily dealing with a determination of whether an SR header is to be added to a packet. Also this code works with respect to a return path from a server, for server-generated packets. In one embodiment, the addition of an SR header may be done on a per-layer 3 basis, and allows the mechanism to be maintained substantially completely stateless and isolated off the rest of the kernel code. The code effectively ignores loopback packets, as well as the packets already containing an SR header, thus allowing a degree of compatibility with the other SR implementations in the kernel. For the other packets, the code looks up whether a particular server is responsible for serving the service that the packet is sourced from. If the particular is responsible, then the packet is accepted, e.g., NF_ACCEPTed, and downstream packets may be sent with no additional SR header apart from the address of the server itself.

It should be appreciated that with respect to 4 checksums, a TCP checksum appears to be calculated later in the process of sending of the packet than as executed by a hook. This results in a checksum being calculated for a destination that is a first SR destination, which may be less than desirable. Therefore, in a module in accordance with this disclosure, a TCP checksum may be precalculated for TCP packets using the service or the original destination as part of a pseudo-header.

An API may be through input/output controls (IOCTLs) to /dev/segrt6. In one embodiment, text reads and writes serve as a relatively easy mechanism.

One embodiment of a module prototype may be as follows:
1) The servers hosting "services" to listen on a transparent socket setsockopt (s, SOL_IP, IP_FREEBIND, &on, sizeof on) to make the socket transparent. After that, if it is bound to "::", the "service" will generally respond to requests on substantially any address directed at a host. The "services" typically do not need to have IPv6 routing enabled, although the services generally have a default route.
2) The servers hosting the "services" advertise the services that they are ready to intercept for, e.g.,
echo service add 2001:db8:ffff:2>/dev/segrt6
removing of interest happens using the "del" keyword, i.e.:
echo service del 2001:db8:ffff:2>/dev/segrt6
"echo service >/dev/segrt6" will dump the currently services the server node is configured to intercept.
3) The devices configure which interest list they would add. This may be accomplished, in one embodiment, as follows:
echo segment new 2001:db8:ffff::1/128>/dev/segrt6
echo segment add 2001:db8:ffff::1/128 2001:db8:1001::2>/dev/segrt6
echo segment add 2001:db8:ffff::1/128 2001:db8:1002::2>/dev/segrt6
This configures the SR list for the service 2001:db8:ffff:1 to be [2001:db8:1001::2, 2001:db8:1002::2].

It should be appreciated that the above embodiment of a module prototype is an example of a suitable implementation. Other suitable implementations and/or mechanisms may be implemented to perform substantially the same functionality.

SR allows an IPv6 or MPLS packet header to encode a list of explicit waypoints, as for example SR Nodes, rather than a single destination. Waypoints may also be used to route packets through a specific service or application. It may effectively be defined how IPv6 SR may be used to "hunt" for a particular service which may reside on substantially any SR-capable node running an application which will provide such a service. These rely on the ability of an SR node to effectively "intercept" a packet at an intermediate waypoint on the way to a final destination identified in an SR list and, more importantly, rely on the ability for subsequent packets to reach this same waypoint and not be intercepted by any waypoint for the life of a session. As such, services may be distributed on different server nodes. A list of candidate nodes used to find a requested service is generally defined by the SR list with the last entry in the SR list effectively identifying the service itself. An example may be, but is not limited to being, uniquely identifiable chunks of data in a content caching or video delivery application.

The approach described in this disclosure has significant advantages including, but not limited to including, not requiring any DNS to access servers hosting requested services, substantially naturally implementing some "in the network" load balancing as an overloaded server may decide to just send the packet to a next hop although it actually hosts the requested service, implementing network built-in failover mechanism based on VRRP which allows server maintenance such as an upgrade without endpoints noticing, effectively not mandating any particular server physical deployment model when a server is virtual or otherwise co-located with a router, and enabling a traditional router to implement a "micro-server" that essentially only knows how to respond to a particular service substantially simultaneously.

Service function chaining (SFC) utilizes an NSH header to carry service and/or application information from node to node along a chain of various link types, and generally operates at a data link layer below IP in terms of encapsulation. An NSH header generally operates as a least common denominator to be added onto a variety of other protocols and encapsulations that already exist. The systems and method of the current disclosure may be used at an IPv6 SR and TCP level, and NSH may operate at an application level within an IPv6 SR domain. In one embodiment, service hunting occurs to determine where to terminate a TCP session within IPv6 SR when it is not known in advance on which node a TCP session is to be established.

In accordance with this disclosure, SR allows an IPv6 or MPLS packet header to encode a list of explicit waypoints, e.g., SR capable nodes, rather than a single destination. Waypoints or SR nodes may also be used to route packets through a specific service or application. Using IPv6 to effectively hunt for a particular service that may reside on substantially an SR capable node that runs an application which will provide such a service increases the efficiency with which a particular service may be provided to a client. SR capable nodes which are effectively intermediate waypoints along a route to a final destination of an SR list may intercept a packet. A particular waypoint which intercepts a first packet during a session may also intercept subsequent packets when the subsequent packets reach the particular waypoint, while no other intermediate waypoints intercept the subsequent packets for the duration or life of the session. As a result, services may be distributed on different server nodes.

Although only a few embodiments have been described in this disclosure, it should be understood that the disclosure may be embodied in many other specific forms without departing from the spirit or the scope of the present disclosure. By way of example, while the present disclosure has been described in the context of IPv6, it should be appreciated that the present disclosure is not limited to being used in the context of IPv6, and that the present disclosure may be applied to other Internet Protocols. In particular, the present disclosure may be applied to substantially any Internet Protocol that supports SR.

An SR capable node may indicate that it may not provide a service even when the service is available on the SR capable node. For instance, if a node determines that it is congested, the node may effectively pretend not to have a requested service, and essentially act as if the services is not available on the node. That is, load balancing may be applied such that an SR capable node may elect to act as if a service hosted on the SR capable node is not available. In one embodiment, an SR capable node which hosts a requested service may decide to accommodate a certain number of requests for the service, e.g., the SR capable node may decide to accept every other request for a service hosted on the SR capable node.

It should be appreciated that methods of the disclosure may be applied to any suitable content. Suitable content may include, but is not limited to including, video content, AV content, and/or classified traffic and policy. As such, an SR header in a packet may be used to effectively express an intent relating to data that may be obtained and followed by a network. Traffic may be classified by a network, or by an application. In one embodiment, instances of applications may effectively be classified as types of content.

The insertion of an SR list, as for example into a packet, may be implemented in any suitable manner. For example, an SR list insertion may be implemented in a client, in a proxy working at layer 3, or in layer 4, e.g., in TCP. In general, the insertion of an SR list may be implemented by substantially any entity which represents an ingress point of a SR domain. It should be appreciated that inserting and/or removing SR lists may result in a change in a slight IP stack of a TCP client, in one embodiment. Thus, an SR list may be inserted at a client or may be inserted in a piece of network equipment inline, as for example where a substantially full TCP proxy may typically be used The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. An apparatus comprising:
a processor;
an input/output (I/O) interface, the I/O interface being configured to obtain a SYN packet, wherein the SYN packet identifies a requested service and includes a source set to identify an endpoint, a destination set to identify a server, and a segment routing (SR) list; and
a logic arrangement, the logic arrangement including program code for execution by the processor and a routing logic module configured to support SR and service hunting, wherein the routing logic module is configured to support the service hunting by verifying whether the requested service is available from the apparatus, wherein the apparatus provides the requested service to the endpoint if it is verified that the requested service is available and the routing logic module routes the SYN packet to a first destination identified in the SR list and sends the SYN packet towards the first destination if it is verified that the requested service is not available from the apparatus.

2. The apparatus of claim 1, wherein the first destination is an entry in the SR list and also a last address in a SR header associated with the SYN packet.

3. The apparatus of claim 1, further including a data storage arrangement, the data storage arrangement including a lookup table, wherein the routing logic module is configured to support the service hunting by determining whether the requested service is included in the lookup table.

4. The apparatus of claim 3, wherein when it is determined that the requested service is not included in the lookup table, the requested service is verified as not available from the apparatus.

5. The apparatus of claim 1, wherein the routing logic module modifies the SYN packet prior to routing the SYN packet to the first destination.

6. The apparatus of claim 5, wherein the routing logic module modifies the SYN packet by modifying a destination in the SYN packet to specify the first destination.

7. The apparatus of claim 1, wherein the SR list identifies a plurality of waypoints along a path that includes an endpoint, the apparatus, and the first destination, and wherein the I/O interface obtains the SYN packet from the endpoint.

8. The apparatus of claim 7, wherein the apparatus is located along the path between the endpoint and the first destination.

9. The apparatus of claim 1, wherein a first entry in the SR list identifies the requested service.

10. The apparatus of claim 1, wherein, when the apparatus provides the requested service to the endpoint, the apparatus facilitates establishing a transmission control protocol (TCP) session between the endpoint and the apparatus.

11. A method comprising:
obtaining, at an apparatus configured to support segment routing and service hunting, a SYN packet, wherein the SYN packet identifies a requested service and includes a source set to identify an endpoint, a destination set to identify a server, and a segment routing (SR) list;
verifying whether the requested service is available from the apparatus;
providing the requested service to the endpoint if it is verified that the requested service is available; and
routing the SYN packet to a first destination identified in the SR list and sending the SYN packet towards the first destination if it is verified that the requested service is not available from the apparatus.

12. The method of claim 11, wherein the first destination is an entry in the SR list and also a last address in a SR header associated with the SYN packet.

13. The method of claim 11, wherein the apparatus includes a data storage arrangement including a lookup table, and wherein verifying whether the requested service is available from the apparatus comprises:
   determining whether the requested service is included in the lookup table.

14. The method of claim 13, wherein when it is determined that the requested service is not included in the lookup table, the requested service is verified as not available from the apparatus.

15. The method of claim 11, further comprising:
   modifying the SYN packet prior to routing the SYN packet to the first destination.

16. The method of claim 15, wherein modifying the SYN packet includes modifying a destination in the SYN packet to specify the first destination.

17. The method of claim 11, wherein the SR list identifies a plurality of waypoints along a path that includes an endpoint, the apparatus, and the first destination.

18. The method of claim 17, wherein the apparatus is located along the path between the endpoint and the first destination.

19. The method of claim 11, wherein a first entry in the SR list identifies the requested service.

20. The method of claim 11, wherein providing the requested service to the endpoint includes facilitating establishing a transmission control protocol (TCP) session between the endpoint and the apparatus.

* * * * *